United States Patent
Yamauchi et al.

(10) Patent No.: US 10,679,014 B2
(45) Date of Patent: Jun. 9, 2020

(54) METHOD FOR PROVIDING TRANSLATION INFORMATION, NON-TRANSITORY COMPUTER-READABLE RECORDING MEDIUM, AND TRANSLATION INFORMATION PROVIDING APPARATUS

(71) Applicant: Panasonic Intellectual Property Management Co., Ltd., Osaka (JP)

(72) Inventors: Masaki Yamauchi, Osaka (JP);
Nanami Fujiwara, Nara (JP);
Masahiro Imade, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

(21) Appl. No.: 15/988,499

(22) Filed: May 24, 2018

(65) Prior Publication Data

US 2018/0357224 A1 Dec. 13, 2018

(30) Foreign Application Priority Data

Jun. 8, 2017 (JP) .................................. 2017-113677
Jan. 29, 2018 (JP) .................................. 2018-012619

(51) Int. Cl.
*G06F 17/28* (2006.01)
*G06F 40/47* (2020.01)
*G06F 40/51* (2020.01)
*G06F 40/30* (2020.01)

(52) U.S. Cl.
CPC .............. *G06F 40/47* (2020.01); *G06F 40/51* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 7,848,915 B2* | 12/2010 | Gao | ........................ | G06F 40/51 |
| | | | | 704/2 |
| 8,150,677 B2* | 4/2012 | Menezes | ............. | G06F 17/2872 |
| | | | | 704/2 |
| 8,204,739 B2* | 6/2012 | Waibel | ................ | G10L 15/1815 |
| | | | | 704/10 |
| 8,972,268 B2* | 3/2015 | Waibel | .................... | G10L 15/22 |
| | | | | 704/277 |
| 9,342,499 B2* | 5/2016 | Madnani | ............... | G06F 40/253 |

(Continued)

FOREIGN PATENT DOCUMENTS

| | | |
|---|---|---|
| JP | 2005-078318 | 3/2005 |
| JP | 2006-127356 | 5/2006 |

(Continued)

*Primary Examiner* — Satwant K Singh
(74) *Attorney, Agent, or Firm* — Greenblum & Bernstein, P.L.C.

(57) ABSTRACT

A translation information providing apparatus includes a forward translator that generates a first translation by translating a first original sentence in a first language into a second language, a back translator that generates a first back translation by back-translating the first translation into the first language, and a translation result outputter that outputs at least either the first original sentence or the first translation and, as the first back translation, a back translation that semantically matches or is semantically similar to the first original sentence.

9 Claims, 12 Drawing Sheets

(56) References Cited

U.S. PATENT DOCUMENTS

| | | | |
|---|---|---|---|
| 9,582,502 B2* | 2/2017 | Endo | G06F 17/289 |
| 10,460,040 B2* | 10/2019 | Eck | G06F 17/2818 |
| 10,489,507 B2* | 11/2019 | Li | G06F 17/273 |
| 2014/0350913 A1* | 11/2014 | Cheng | G06F 17/289 704/2 |
| 2015/0046147 A1* | 2/2015 | Waibel | G06F 40/58 704/2 |
| 2016/0092437 A1 | 3/2016 | Endo et al. | |
| 2019/0236147 A1* | 8/2019 | Lee | G06F 17/2836 |

FOREIGN PATENT DOCUMENTS

| | | |
|---|---|---|
| JP | 2016-071439 | 5/2016 |
| JP | 2016-218995 | 12/2016 |

* cited by examiner

METHOD FOR PROVIDING TRANSLATION INFORMATION, NON-TRANSITORY COMPUTER-READABLE RECORDING MEDIUM, AND TRANSLATION INFORMATION PROVIDING APPARATUS

BACKGROUND

1. Technical Field

The present disclosure relates to a method for providing translation information, a non-transitory computer-readable recording medium, and a translation information providing apparatus that generate translations from original sentences.

2. Description of the Related Art

During these years, machine translation for translating a sentence in a first language into a second language different from the first language is being studied and developed. In order to improve the performance and user experience of machine translation, a method has been disclosed in which a sentence translated into the second language is back-translated into the first language and a result of the back translation is used.

In Japanese Patent No. 3936687, for example, a machine translation evaluation apparatus is disclosed that evaluates the quality of a forward translation obtained by performing machine translation into a second language on an original sentence in a first language. The machine translation evaluation apparatus includes a forward machine translator that obtains the original sentence and that performs machine translation on the original sentence to obtain the forward translation in the second language, n (n≥2) back machine translators that generate back translations by performing machine translation into the first language on the forward translation, and an evaluator that evaluates the quality of the forward translation on the basis of the n back translations generated by the n back machine translators and scores indicating degrees of matching with or similarity to the original sentence.

In addition, in Japanese Unexamined Patent Application Publication No. 2006-127356, a machine translation apparatus is disclosed including an inputter that receives, from the outside, an original sentence in a first language, a translator that translates the original sentence into a plurality of translations in a second language, a retranslator that retranslates the plurality of translations into retranslations in the first language, a display that displays the original sentence, the translations, and the retranslations, a first determiner that compares the original sentence and the retranslations with each other and determines differences between the original sentence and the retranslations, and a display controller that displays retranslations having the differences in a distinguishable manner on the basis of results of the determination made by the first determiner.

In addition, in Japanese Unexamined Patent Application Publication No. 2016-71439, a translation method is disclosed including obtaining an original sentence to be translated, obtaining translations of the original sentence by performing forward translation and back translations of the translations by performing back translation for a plurality of translation policies, ranking the plurality of translation policies in accordance with degrees of similarity between the back translations based on the plurality of translation policies and the original sentence, and displaying the translations based on the plurality of translation policies while associating the translations with the ranking. The forward translation and the back translation are consistently performed for each of the plurality of policies.

In addition, in Japanese Unexamined Patent Application Publication No. 2016-218995, a machine translation method performed by a machine translation system that is connected to an information output apparatus which outputs language information and that performs translation between a first language and a second language is disclosed. The machine translation method includes receiving a translation target sentence in the first language, generating a plurality of different forward translations by translating the received translation target sentence into the second language, generating a plurality of back translations by back-translating the plurality of different forward translations into the first language, and outputting, if an operation for selecting one of the plurality of back translations is received after the information output apparatus outputs the plurality of back translations, a forward translation corresponding to the back translation.

SUMMARY

In the examples of the related art, however, improvement in the quality of back translations is not examined or mentioned. In addition, the physical sensation of decreases in the translation quality of back translation results produced by a personal translation device due to inconsistencies in translation of words with multiple meanings is not examined or addressed, either.

In one general aspect, the techniques disclosed here feature a method for providing translation information performed by a translation information providing apparatus that translates a plurality of languages. The method includes generating a first translation by translating a first original sentence in a first language into a second language, generating a first back translation by back-translating the first translation into the first language, and outputting at least either the first original sentence or the first translation and, as the first back translation, a back translation that semantically matches or is semantically similar to the first original sentence.

According to the present disclosure, even when translations include words with multiple meanings, the quality of back translations improves on the basis of original sentences, and the physical sensation of decreases in translation quality due to inconsistencies in translation of the words with multiple meanings can be avoided.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
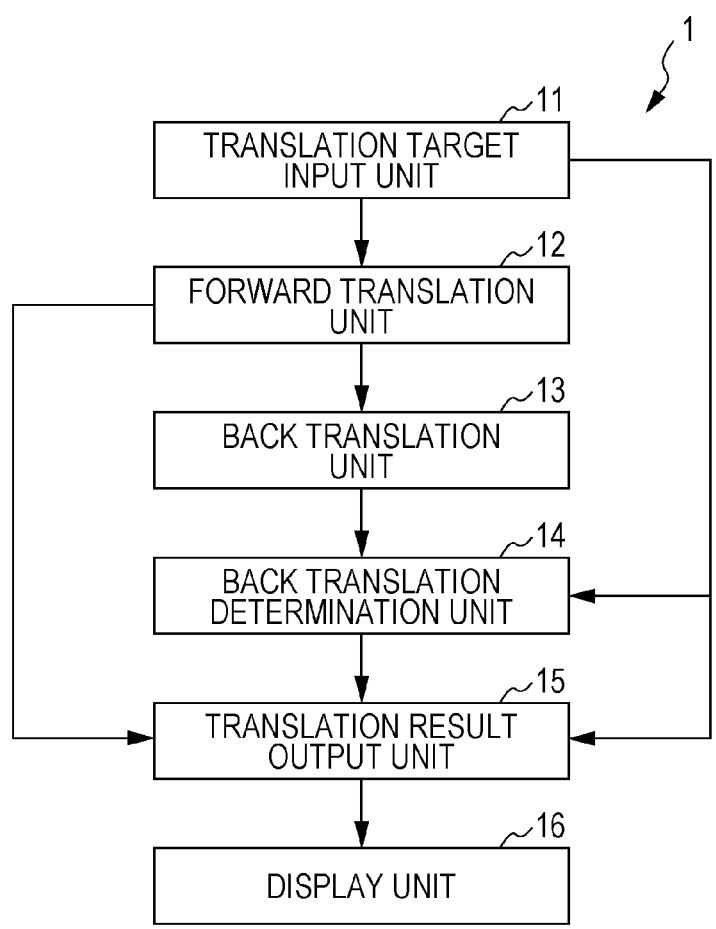
FIG. 1 is a block diagram illustrating an example of the configuration of a translation information providing apparatus according to a first embodiment of the present disclosure.

Underlying Knowledge Forming Basis of the Present Disclosure

As described above, in conventional translation devices, improvement in the quality of back translations is not examined or mentioned. The physical sensation of decreases in the translation quality of back translation results produced by a personal translation device due to inconsistencies in translation of words with multiple meanings is not examined or addressed, either.

When a translation device is actually used to translate an original language into a target language, on the other hand, a user of the translation device is not necessarily familiar with the target language. The user, therefore, might not understand a translation in the target language and might not be able to determine whether the translation is correct.

For this reason, a translation in the target language is back-translated into the original language, and a resultant back translation is compared with an original sentence in the original language in order to understand the translation. By performing translation twice, that is, (A) a sentence in an original language→(B) a translation in a target language→(C) a back translation in the original language, the validity of (B) the translation in the target language is often estimated in actual practice.

When (B) the translation in the target language includes a word with multiple meanings and back-translated into (C) the back translation in the original language, however, the meaning of the sentence can be inconsistent.

When (B) the translation in the target language includes "bathroom" (English), for example, which is a word with multiple meanings, "bathroom" can be translated into one of a plurality of words in (C) the back translation in the original language, such as "bath" and "powder room" (Japanese). If an original sentence is "Where is a powder room?" (Japanese) in this case, the following result is obtained through translation and back translation.

Original sentence (Japanese): Where is a powder room?
Translation (English): Where is a bathroom?
Back translation (Japanese): Where is a bath?

Since the original sentence and the back translation in the original language do not necessarily semantically match in this example, the translation can be erroneously estimated to be incorrect even through the translation is actually correct. This problem can occur in any of rule-based translation, example-based translation, statistical translation, and neural translation.

It is difficult to determine, for example, whether the translation, "Where is a bathroom?", means "Where is a powder room?" or "Where is a bath?" just by reading the translation (English in this case). It is therefore difficult to identify, with a conventional translation method (rule-based translation, example-based translation, statistical translation, or neural translation), an intended meaning when learning data includes a word with multiple meanings.

That is, in the case of the translation, "Where is a bathroom?", it is difficult to determine, with a conventional translation method, which of a plurality of meanings an intended meaning is just by reading the translation, and only a likely result of sorting of examples and translations included in learning data based on some index (probability distribution, the order of words in a dictionary, or the like) is output. In practice, therefore, it is important to find a way to improve the quality of back translations in order to address the physical sensation of decreases in translation quality due to inconsistencies in translation of words with multiple meanings.

One non-limiting and exemplary embodiment provides a back translation determination unit, for example, that stores an original sentence, forward translations, and back translations while associating the original sentence, the forward translations, and the back translations with one another. A back translation that matches or is similar to the original sentence is then selected and output and displayed as a back translation result.

That is, when there is a back translation that semantically matches or is semantically similar to an original sentence, the back translation can be employed as an appropriate output as a result of comparison with the original sentence, even if the back translation is not evaluated by an independent back translation device as a best back translation result (e.g., is not output as a translation result).

In addition, a conventional translation device can obtain a plurality of candidates for a forward translation result. By employing a forward translation result that will increase a degree of similarity between a back translation and an original sentence, the physical sensation of users of forward translation and back translation about translation quality can improve. This discussion, however, is not examined or addressed in the examples of the related art.

In order to solve the above problem, in the present disclosure, for example, an original sentence J is translated to obtain a set {JE(k)|k=1, ..., n} of translations JE, and the translations JE(k) are back-translated to obtain a set {JE(k)J(i(k))|k=1, ..., n, i(k)=1, ..., m} of back translations JEJ. Here, (k) and (i(k)) are indices indicating members, and n and m are integers equal to or larger than 1. In addition, a back translation determination unit that stores an original sentence, forward translations, and back translations of the forward translations while associating the original sentence, the forward translations, and the back translations with one another is provided. A back translation that matches or is similar to the original sentence is then selected, a forward translation corresponding to the selected back translation is extracted, and the back translation and the forward translation are output and displayed.

As described above, the physical sensation of translation quality improves by associating an original sentence and back translations with each other and selecting a back translation that matches or is similar to the original sentence. As a result, a translation device, a translation display device, a translation display system, a method for displaying a translation, and the like that are cost-efficient and highly accurate can be achieved.

The present inventors has established the present disclosure on the basis of the above knowledge as a result of examination of a way to select or determine a back translation obtained by back-translating a translation when the translation includes a word with multiple meanings.

A method for providing translation information according to an aspect of the present disclosure is a method for providing translation information performed by a translation information providing apparatus that translates a plurality of languages. The method includes generating a first translation by translating a first original sentence in a first language into a second language, generating a first back translation by back-translating the first translation into the first language, and outputting at least either the first original sentence or the first translation and, as the first back translation, a back translation that semantically matches or is semantically similar to the first original sentence.

With this configuration, a first translation is generated by translating a first original sentence in a first language into a second language, a first back translation is generated by back-translating the first translation into the first language, and at least either the first original sentence or the first translation and, as the first back translation, a back translation that semantically matches or is semantically similar to the first original sentence are output. As a result, the back translation output along with the original sentence or the translation, therefore, semantically matches or is semantically similar to the original sentence, and the quality of the back translation improves. In addition, when there is a back translation that semantically matches or is semantically similar to an original sentence, the back translation can be employed as an appropriate output as a result of comparison with the original sentence even if the back translation is not evaluated as a best back translation result (e.g., is not output as a translation result). Even when an original sentence includes a word with multiple meanings, therefore, the quality of back translations improves on the basis of the original sentence and the physical sensation of decreases in translation quality due to inconsistencies in translation of words with multiple meanings can be avoided.

A second translation may be generated by translating a second original sentence in the first language semantically different from the first original sentence into the second language. A second back translation may be generated by back-translating the second translation into the first language. If the first and second translations are the same, at least either the second original sentence or the second translation and, as the second back translation, a back translation that is semantically different from the first back translation and that semantically matches or is semantically similar to the second original sentence may be output.

With this configuration, a second translation is generated by translating a second original sentence in the first language semantically different from the first original sentence into the second language. A second back translation is generated by back-translating the second translation into the first language. If the first and second translations are the same, at least either the second original sentence or the second translation and, as the second back translation, a back translation that is semantically different from the first back translation and that semantically matches or is semantically similar to the second original sentence are output. As a result, when the first translation or the second translation includes a word with multiple meanings and the first and second original sentences are semantically different from each other but the first and second translations of the first and second original sentences, respectively, are substantially the same, the second back translation of the second translation becomes different from the first back translation of the first translation in accordance with the second original sentence.

A plurality of first back translations may be generated by back-translating the first translation into the first language. A first back translation set including at least one back translation that semantically matches or is semantically similar to the first original sentence may be generated, the at least one back translation being one of the plurality of first back translations. At least either the first original sentence or the first translation and the first back translation set may be output.

With this configuration, a plurality of first back translations are generated by back-translating the first translation into the first language. A first back translation set including at least one back translation that semantically matches or is semantically similar to the first original sentence is generated, the at least one back translation being one of the plurality of first back translations. At least either the first original sentence or the first translation and the first back translation set are output. As a result, back translations that semantically match or are semantically similar to the first original sentence are extracted from the plurality of first back translations as good back translations to generate the first back translation set, and the first back translation set, the first original sentence, and the first translation can be associated with one another and output.

A plurality of first translations may be generated by translating the first original sentence into the second language. A plurality of first back translations may be generated by back-translating the plurality of first translations into the first language. A first back translation set including at least one back translation that semantically matches or is semantically similar to the first original sentence may be generated, the at least one back translation is one of the plurality of first back translations. At least either the first original sentence or the first translation and the first back translation set may be output.

With this configuration, a plurality of first translations are generated by translating the first original sentence into the second language. A plurality of first back translations are generated by back-translating the plurality of first translations into the first language. A first back translation set including at least one back translation that semantically matches or is semantically similar to the first original sentence is generated, the at least one back translation is one of the plurality of first back translations. At least either the first original sentence or the first translation and the first back translation set are output. As a result, at least one first back translation can be generated for each of the plurality of first translations, back translations that semantically match or are semantically similar to the first original sentence are extracted, as good back translations, from the plurality of first back translations generated from the plurality of first translations to generate the first back translation set, and the first back translation set, the first original sentence, and the first translation can be associated with one another and output.

A degree of similarity indicating whether the first back translation semantically matches the first original sentence or how much the first back translation is semantically similar to the first original sentence may be calculated. A first back translation set including at least one back translation whose degree of similarity is higher than a certain value may be generated. At least either the first original sentence or the first translation and the first back translation set may be output.

With this configuration, a degree of similarity indicating whether the first back translation semantically matches the first original sentence or how much the first back translation is semantically similar to the first original sentence is calculated. A first back translation set including at least one back translation whose degree of similarity is higher than a certain value is generated. At least either the first original sentence or the first translation and the first back translation set are output. As a result, the first back translation set including the back translations that semantically match or are semantically similar to the first original sentence can be generated and output.

The first original sentence and the first back translation set may be displayed on a display. If a certain operation is performed for the first original sentence and the first back translation set, the first translation may be displayed on the display.

With this configuration, the first original sentence and the first back translation set are displayed on a display. If a certain operation is performed for the first original sentence and the first back translation set, the first translation is displayed on the display. As a result, the first translation can be displayed after it is confirmed that the first original sentence and the first back translation set semantically match or are semantically similar to each other, and it is possible to certainly avoid the physical sensation of decreases in translation quality due to inconsistencies in translation of words with multiple meanings.

The first original sentence and the first back translation may be displayed on a display. If a certain operation is performed for the first original sentence and the first back translation, the first translation may be displayed on the display.

With this configuration, the first original sentence and the first back translation are displayed on a display. If a certain operation is performed for the first original sentence and the first back translation, the first translation is displayed on the display. As a result, the first translation can be displayed after it is confirmed that the first original sentence and the first back translation semantically match or are semantically similar to each other, and it is possible to certainly avoid the physical sensation of decreases in translation quality due to inconsistencies in translation of words with multiple meanings.

If the certain operation is input, the first translation may be displayed on the display in a direction different from a direction of the first original sentence.

With this configuration, if the certain operation is input, the first translation is displayed on the display in a direction different from a direction of the first original sentence. As a result, when a user whose mother tongue is the first language and a user whose mother tongue is the second language face each other, the first original sentence is displayed to the user whose mother tongue is the first language, and the first translation is displayed to the user whose mother tongue is the second language.

In addition, the present disclosure can not only be implemented as the method for providing translation information by which the above-described characteristic processes are performed but also be implemented as a non-transitory computer-readable recording medium storing a program for causing a computer to perform the characteristic processes included in the method for providing translation information. In addition, the present disclosure can also be implemented as a translation information providing apparatus or the like including characteristic components corresponding to the characteristic processes included in the method for providing translation information. In other aspects that will be described hereinafter, too, the same advantageous effects as those produced by the method for providing translation information can be produced.

A non-transitory computer-readable recording medium according to another aspect of the present disclosure is a non-transitory computer-readable recording medium storing a translation information providing program for causing a computer to function as a translation information providing apparatus that translates a plurality of languages. The computer performing operations includes generating a first translation by translating a first original sentence in a first language into a second language, generating a first back translation by back-translating the first translation into the first language, and outputting at least either the first original sentence or the first translation and, as the first back translation, a back translation that semantically matches or is semantically similar to the first original sentence.

A translation information providing apparatus according to another aspect of the present disclosure is a translation information providing apparatus that translates a plurality of languages. The translation information providing apparatus includes a forward translator that generates a first translation by translating a first original sentence in a first language into a second language, a back translator that generates a first back translation by back-translating the first translation into the first language, and a translation result outputter that outputs at least either the first original sentence or the first translation and, as the first back translation, a back translation that semantically matches or is semantically similar to the first original sentence.

It is needless to say that the program may be distributed through a communication network such as the Internet.

In addition, the present disclosure may be implemented as a system in which some of the components of the translation information providing apparatus according to an aspect of the present disclosure and other components are distributed among a plurality of computers.

Embodiments described hereinafter are specific examples of the present disclosure. Values, shapes, components, steps, the order of the steps, and the like are examples, and do not limit the present disclosure. Among the components described in the following embodiments, ones not described in the independent claims, which define broadest concepts, will be described as arbitrary components. Any embodiment may be combined with another embodiment.

The embodiments of the present disclosure will be described with reference to the drawings.

First Embodiment

FIG. 1 is a block diagram illustrating an example of the configuration of a translation information providing apparatus 1 according to a first embodiment of the present disclosure. The translation information providing apparatus 1 illustrated in FIG. 1 includes a translation target input unit 11, a forward translation unit 12, a back translation unit 13, a back translation determination unit 14, a translation result output unit 15, and a display unit 16.

The translation target input unit 11 receives a certain operation performed by a user to receive a translation target sentence input by the user and outputs the translation target sentence to the forward translation unit 12, the back translation determination unit 14, and the translation result output unit 15. A translation target sentence, "Where is a lavatory?", for example, is input to the translation target input unit 11. A language input, output, generated, and displayed by the translation information providing apparatus 1 is not particularly limited to Japanese, and may be another language, instead, such as English, Chinese, Korean, French, German, Italian, Portuguese, Thai, Vietnamese, or Indonesian.

The forward translation unit 12 translates the translation target sentence input from the translation target input unit 11 from an original language into a target language to generate a translation and outputs the generated translation to the back translation unit 13 and the translation result output unit 15. Here, a translation obtained by the forward translation unit 12 is called a "forward translation". A translation target sentence is an example of a first original sentence in a first language, and a forward translation is an example of a first translation obtained by translating the first original sentence in the first language into a second language. The number of forward translations to be generated need not necessarily be one, and a plurality of forward translations may be generated as translation candidates.

The back translation unit 13 back-translates the forward translation generated by the forward translation unit 12 into the original language to generate a translation and outputs the generated translation to the back translation determination unit 14. Here, a translation generated by the back translation unit 13 is called a "back translation". A back translation is an example of a first back translation obtained by back-translating a first translation into the first language. The number of back translations to be generated from a single forward translation need not necessarily be one, and a plurality of back translations may be generated as back translation candidates.

One of various known methods, such as rule-based translation, example-based translation, machine translation employing a statistical method, neural network translation, and manual translation through crowd sourcing, may be used for translation of a translation target sentence performed by the forward translation unit 12 and back translation of a forward translation performed by the back translation unit 13.

When a plurality of forward translations are generated, the plurality of forward translations may be generated using a plurality of different translation methods. Alternatively, when a plurality of forward translations are generated, a plurality of forward translation candidates may be generated using a single translation method, and then any number of forward translations may be selected or extracted using N-best algorithms or the like.

In addition, when a plurality of back translations are generated, the plurality of back translations may be generated using a plurality of different translation methods. Alternatively, when a plurality of back translations are generated, a plurality of back translation candidates may be generated using a single translation method, and then any number of back translations may be selected or extracted using N-best algorithms or the like. A translation method used for back translation may be the same as or different from a translation method used for forward translation.

The back translation determination unit 14 determines whether there are a plurality of back translations. If there are a plurality of back translations, the back translation determination unit 14 calculates degrees of similarity by comparing a translation target sentence and the back translations, selects and determines a back translation whose degree of similarity to the translation target sentence is equal to or higher than a certain value as a back translation result and outputs the back translation result to the translation result output unit 15. If the number of back translations is one, on the other hand, the back translation determination unit 14 outputs the back translation to the translation result output unit 15 as a back translation result.

As a method for calculating a degree of similarity, a method based on an edit distance between a translation target and a back translation, a method in which a sentence including a character string that frequently appears in language models is selected, a method for determining a degree of similarity in accordance with the user's past inputs and selections, a method for determining a degree of similarity through calculation based on vector representations (distributed representations) of words and sentences, or the like may be used, or one of various known methods may be used. Alternatively, a method may be employed in which the user is asked to input a degree of similarity.

More specifically, the back translation determination unit 14 obtains a degree of similarity by normalizing a distance between vector representations (distributed representations) of sentences within a range of 0 to 1. In this case, a degree of similarity close to 1 indicates that a distance between sentences is small and the sentences are similar to each other. When the degree of similarity is 1, a translation target sentence and a back translation match. A known method, such as an inner product between vectors, may be used as a method for calculating a distance (a degree of similarity) between vectors.

If a first back translation, "Do you know where a powder room is?", and a second back translation, "Where is a bath?", are obtained for the translation target sentence, "Where is a powder room?", for example, the back translation determination unit 14 calculates a degree of similarity between vector representations of the first and second back translations and the translation target sentence. If the degree of similarity between the first back translation and the translation target sentence is calculated as 0.9 from an inner product between vectors and the degree of similarity between the second back translation and the translation target sentence is calculated as 0.3 from an inner product between vectors, the back translation determination unit 14 selects the first back translation as an appropriate back translation result since the degree of similarity between the first back translation and the translation target sentence is higher than the degree of similarity between the second back translation and the translation target sentence.

A method for determining a back translation result used by the back translation determination unit 14 is not particularly limited to the above example. A method in which back translations are presented to the user and the user is then asked to select a back translation result, a method based on an edit distance between a translation target sentence and a back translation, a method in which a sentence including a character string that frequently appears in language models is selected, a method for determining a back translation result in accordance with the user's past inputs and selections, a method for determining a back translation result through calculation based on vector representations (distributed representations) of words and sentences, or the like may be used, or one of various known methods may be used.

The translation result output unit 15 associates the translation target sentence, the back translation result determined by the back translation determination unit 14, and the forward translation corresponding to the back translation result with one another and outputs the translation target sentence, the back translation result, and the forward translation to the display unit 16 as an output sentence set. The display unit 16 is a certain display, for example, and displays the output sentence set output from the translation result output unit 15.

The output sentence set is not particularly limited to the above example. For example, at least either a translation target sentence (first original sentence) or a forward translation (first translation) and a back translation result (first back translation) that semantically matches or is semantically similar to the translation target sentence may be used as an output sentence set.

The configuration of the translation information providing apparatus 1 is not particularly limited to an example in which a dedicated piece of hardware is used for each function as described above. A translation information providing program for performing the above processes may be installed on one or a plurality of computers or servers (information processing apparatuses) including a central processing unit (CPU), a read-only memory (ROM), a random-access memory (RAM), and an auxiliary storage device, and the one or plurality of computers or servers may function as a translation information providing apparatus. In addition, the forward translation unit 12, the back translation unit 13, the back translation determination unit 14, and the translation result output unit 15 need not necessarily be provided inside the translation information providing apparatus 1. The forward translation unit 12, the back translation unit 13, the back translation determination unit 14, and the translation result output unit 15 may be provided for an external server or the like, and the translation information providing apparatus 1 may obtain necessary information through a certain network, instead. The same applies to other embodiments.

Figure 2:
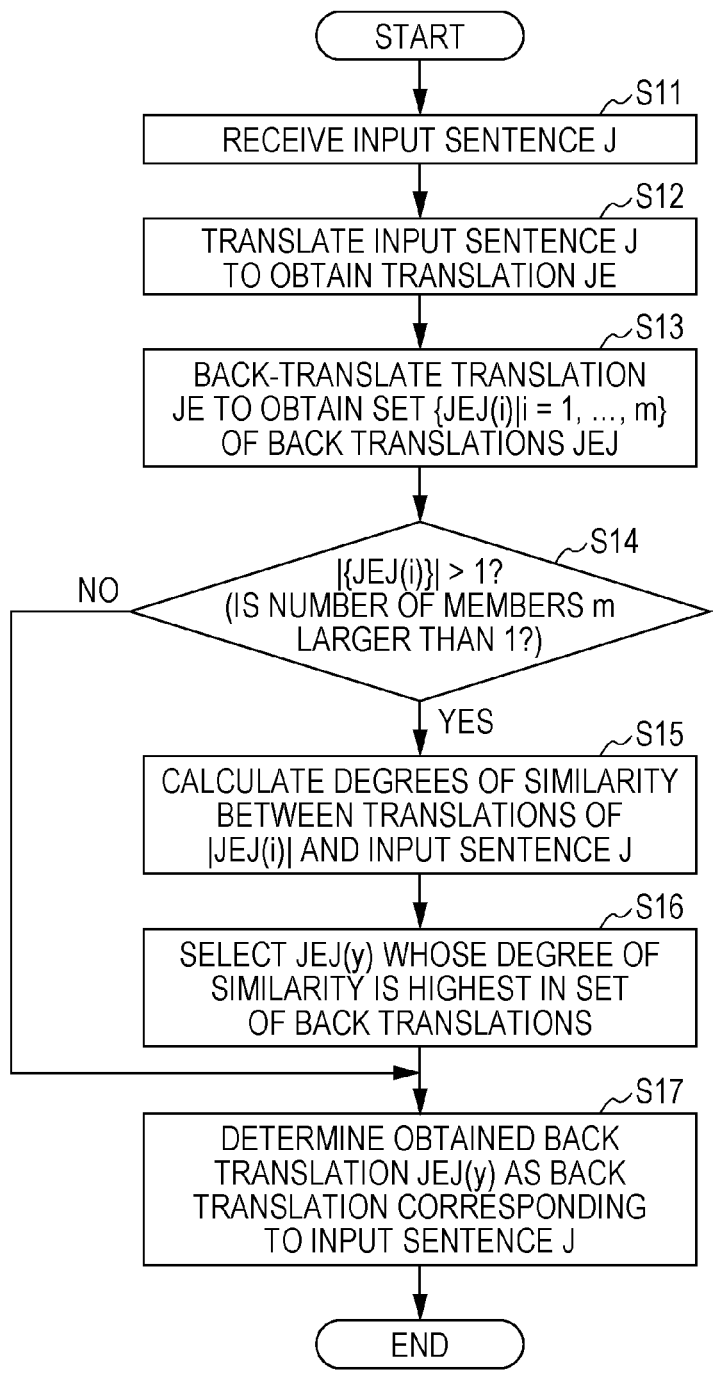
FIG. 2 is a flowchart illustrating an example of a process for providing translation information performed by the translation information providing apparatus illustrated in FIG. 1.

Next, a process for providing translation information performed by the translation information providing apparatus 1 configured as above will be described in detail. FIG. 2 is a flowchart illustrating an example of the process for providing translation information performed by the translation information providing apparatus 1 illustrated in FIG. 1.

First, in step S11, the translation target input unit 11 receives an input sentence J (translation target sentence) through a certain operation performed by the user and outputs the input sentence J to the forward translation unit 12, the back translation determination unit 14, and the translation result output unit 15.

Next, in step S12, the forward translation unit 12 translates the input sentence J into a target language to generate a translation JE (forward translation) and outputs the translation JE to the back translation unit 13 and the translation result output unit 15. The method for generating a forward translation is as described above.

Next, in step S13, the back translation unit 13 back-translates the translation JE into an original language to generate a set $\{JEJ(i)|i=1, \ldots, m\}$ (back translation set) including m back translations JEJ and outputs the set $\{JEJ(i)|i=1, \ldots, m\}$ to the back translation determination unit 14. The method for generating back translations is as described above.

Next, in step S14, the back translation determination unit 14 determines whether the set $\{JEJ(i)|i=1, \ldots, m\}$ of the back translations JEJ includes a plurality of members, that is, whether the number of members m is larger than 1. If the number of back translations is one (m=1), the back translation determination unit 14 determines the back translation JEJ(i) as a back translation result JEJ(y), and the process proceeds to step S17. If there are a plurality of back translations JEJ(i) (m>1), the process proceeds to step S15.

If there are a plurality of back translations JEJ(i) (YES in step S14), the back translation determination unit 14, in step S15, calculates a degree of similarity between each of the m back translations JEJ(i) and the input sentence J. The method for calculating a degree of similarity is as described above.

Next, in step S16, the back translation determination unit 14 selects a back translation JEJ(i) whose degree of similarity is highest in the set $\{JEJ(i)|i=1, \ldots, m\}$ of the back translations JEJ as a back translation result JEJ(y) and outputs the back translation result JEJ(y) to the translation result output unit 15.

Lastly, in step S17, the translation result output unit 15 outputs the obtained back translation result JEJ(y) and the input sentence J to the display unit 16. The display unit 16 displays the back translation result JEJ(y) as a back translation corresponding to the input sentence J, and the process ends.

Although the number of back translations output in steps S14 and S16 as the back translation JEJ(y) is one in the above process, a plurality of back translations may be output, instead. Although the number of translations JE is one in step S12, a plurality of sentences may be used as translations JE.

Figure 3:
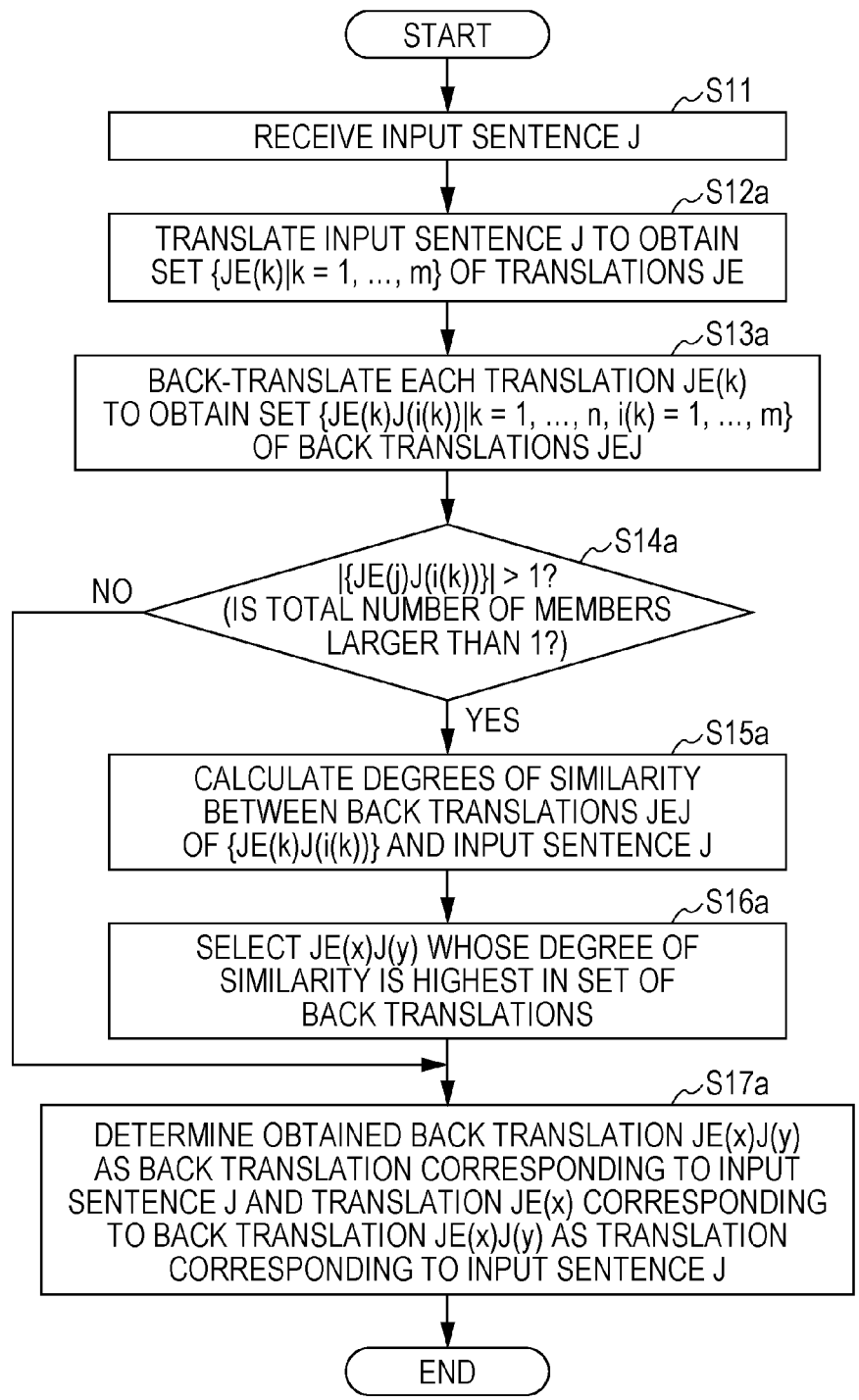
FIG. 3 is a flowchart illustrating another example of the process for providing translation information performed by the translation information providing apparatus illustrated in FIG. 1.

FIG. 3 is a flowchart illustrating another example of the process for providing translation information performed by the translation information providing apparatus 1 illustrated in FIG. 1. The flowchart of FIG. 3 is different from the flowchart of FIG. 2 in that whereas a single translation JE is generated in FIG. 2, a plurality of translations JE are generated in FIG. 3.

First, in step S11, the translation target input unit 11 receives an input sentence J (translation target sentence) through a certain operation performed by the user and outputs the input sentence J to the forward translation unit 12, the back translation determination unit 14, and the translation result output unit 15.

Next, in step S12a, the forward translation unit 12 translates the input sentence J into a target language to generate a set {JE(k)|k=1, . . . , n} including n translations JE(k) (forward translations) and outputs the set {JE(k)|k=1, . . . , n} to the back translation unit 13 and the translation result output unit 15. Although a single forward translation is obtained using a single translation method in step S12 illustrated in FIG. 2, a single translation method or a plurality of translation methods may be used in step S12a as described in the method for generating a forward translation.

Next, in step S13a, the back translation unit 13 back-translates the translations JE(k) into an original language to generate a set {JE(k)J(i(k))|k=1, . . . , n, i(k)=1, . . . , m} of back translations JEJ and outputs the set {JE(k)J(i(k))| k=1, . . . , n, i(k)=1, . . . , m} to the back translation determination unit 14. The method for generating back translations is as described above, and any translation methods may be combined with each other.

Next, in step S14a, the back translation determination unit 14 determines whether the set {JE(k)J(i(k))|k=1, . . . , n, i(k)=1, . . . , m} of the back translations JEJ includes a plurality of members, that is, whether the number of members is larger than 1. If the number of back translations is one, the back translation determination unit 14 determines the back translation JE(k)J(i(k)) as a back translation result JE(x)J(y), and the process proceeds to step S17a. If there are a plurality of back translations JE(k)J(i(k)), the process proceeds to step S15a.

If there are a plurality of back translations JE(k)J(i(k)) (YES in step S14a), the back translation determination unit 14, in step S15a, calculates a degree of similarity between each of the back translations JEJ included in the set {JE(k) J(i(k))|k=1, . . . , n, i(k)=1, . . . , m} and the input sentence J. The method for calculating a degree of similarity is as described above.

Next, in step S16a, the back translation determination unit 14 selects a back translation JE(k)J(i(k)) whose degree of similarity is highest in the set {JE(k)J(i(k))|k=1, . . . , n, i(k)=1, . . . , m} of the back translations JEJ as a back translation result JE(x)J(y) and outputs the back translation result JE(x)J(y) to the translation result output unit 15.

Lastly, in step S17a, the translation result output unit 15 outputs the obtained back translation result JE(x)J(y) and the input sentence J to the display unit 16. The display unit 16 displays the back translation result JE(x)J(y) as a back translation corresponding to the input sentence J and a translation JE(x) corresponding to the back translation result JE(x)J(y) as a translation corresponding to the input sentence J.

Although the number of back translations output in steps S14a and S16a as a back translation result JE(x)J(y) is one in the above process, a plurality of back translation results may be output, instead.

As a result of each of the above processes, a back translation result JEJ(y) or JE(x)J(y) that semantically matches or is semantically similar to an input sentence J can be determined in the present embodiment. By performing translation twice, that is, (A) a sentence in an original language→(B) a translation in a target language→(C) a back translation in the original language, (A) the sentence in the original language and (C) the back translation in the original language tend to semantically match in estimation of the validity of the translation result in the target language, even when (B) the translation in the target language includes a word with multiple meanings. As a result, inconsistencies in the meaning of (C) the back translation in the original language, which is obtained by back-translating (B) the translation in the target language, can be suppressed, and since (A) the sentence in the original language and (C) the back translation in the original language tend to semantically match, (B) the translation in the target language is not erroneously estimated to be incorrect when (B) the translation in the target language is actually correct.

That is, with the techniques disclosed in the examples of the related art, when (B) the translation in the target language includes "bathroom" (English), which is a word with multiple meanings, (C) the back translation in the original language can include one of a plurality of words, namely "bath", "powder room", and "lavatory" (Japanese). When (A) the sentence in the original language (input sentence) is "Where is a powder room?" (Japanese), therefore, following results are obtained through translation and back translation.

Input (Japanese): Where is a powder room?
Translation (English): Where is a bathroom?
Back translation (Japanese): Where is a bath?

As a result of each of the above processes, however, a back translation JEJ(y) or JE(x)J(y) whose degree of similarity to (A) the sentence in the original language (input sentence J) is selected from (C) back translations JEJ in the original language. (C) A back translation in the original language, such as "Where is a powder room?" or "Where is a lavatory?", that matches or is close to (A) the sentence in the original language, "Where is a powder room?", therefore, tends to be presented, and since (A) the sentence in the original language and (C) the back translation in the original language tend to semantically match, (B) the translation in the target language is not erroneously estimated to be incorrect. In addition, in the process illustrated in FIG. 3, a plurality of translations are generated as (B) translations in the target language, and a translation JE(x) corresponding to a back translation result JE(x)J(y) that semantically match or is semantically similar to an input sentence J is determined as a translation corresponding to the input sentence J. A correct translation of the input sentence J, therefore, can be selected from the plurality of translations.

In the present embodiment, the quality of back translations thus improves on the basis of original sentences and the physical sensation of decreases in translation quality due to inconsistencies in translation of words with multiple meanings can be avoided even when translations include such words.

Information used to select a back translation from a translation is not particularly limited to the above example. For example, a word or a phrase included in an original sentence (input sentence) or a synonym thereof may be used, instead. It is especially preferable to use a noun, a proper noun, or a phrase or a sign indicating an interrogative sentence, such as "?", "do you", "does it".

In this case, a synonym of a word or a phrase included in an original sentence is identified by, for example, referring to a thesaurus (not illustrated) saved in the translation information providing apparatus or an external apparatus connected to the translation information providing apparatus. In an example, the following results are obtained.

Original sentence (Japanese): Where is a powder room?
Translation (English): Where is a bathroom?

Back translation (Japanese):
(1) Where is a bath?
(2) Where is it, a bath?
(3) I'd like to know the location of a bathroom.
(4) Where is a powder room?
(5) Do you know where a bath is?
(6) Where is a lavatory?

In this example, as an example of information from an original sentence used to select a back translation, "powder room", "where is", and "?" are words and phrases extracted from the original sentence, and "lavatory" and "location of" are synonyms of the words and phrases included in the original sentence. In the back translation (1), therefore, "where is" and "?" matches the original sentence, and in the back translation (2), "?" matches the original sentence. In the back translation (4), "location of" is a synonym, and "powder room" matches the original sentence. In the back translation (6), "lavatory" is a synonym, and "where is" and "?" match the original sentence. As a result, since the number of pieces of information that matches the information from the original sentence is largest in the back translation (6), the back translation (6) is selected as a back translation result. If "(7) Where is a powder room?" exists as a back translation, for example, "powder room", "where is", and "?" match the original sentence. Because words and phrases that match an original sentence have priority over synonyms, the back translation (7) may be selected as a back translation result.

Figure 4:
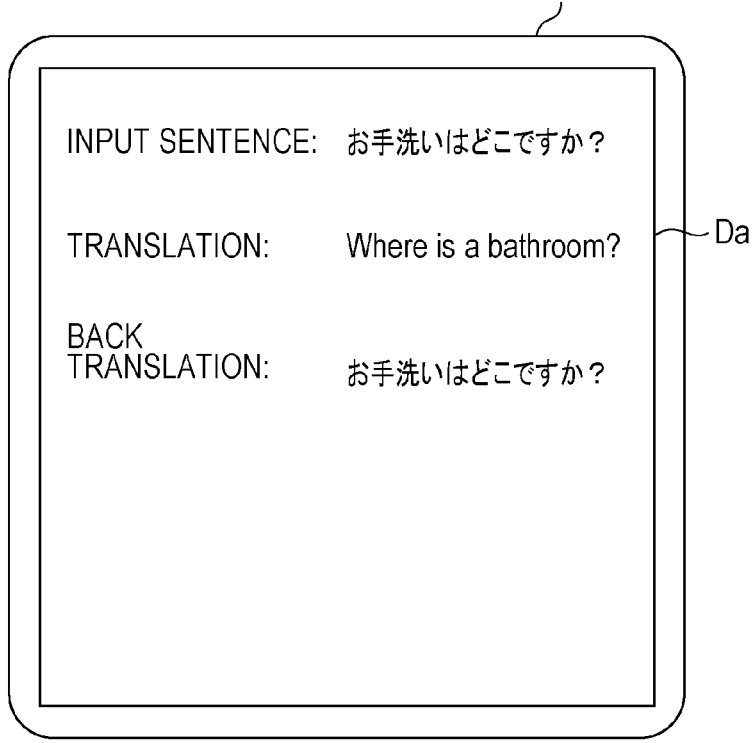
FIG. 4 is a diagram illustrating a first example of a translation information screen displayed on a display unit illustrated in FIG. 1.

Next, a translation information screen displayed on the display unit 16 as a result of the above process will be specifically described. FIG. 4 is a diagram illustrating a first example of the translation information screen displayed on the display unit 16 illustrated in FIG. 1. In the example illustrated in FIG. 4, "Where is a lavatory?" (Japanese) is input as an input sentence (a sentence in an original language), "Where is a bathroom?" (English) is generated as a translation, and "Where is a lavatory?" (Japanese) is selected as a back translation that matches or is similar to the sentence in the original language. In this case, "Input sentence: Where is a lavatory?", "Translation: Where is a bathroom?", and "Back translation: Where is a lavatory?" are displayed on a translation information screen Da of the display unit 16.

Figure 5:
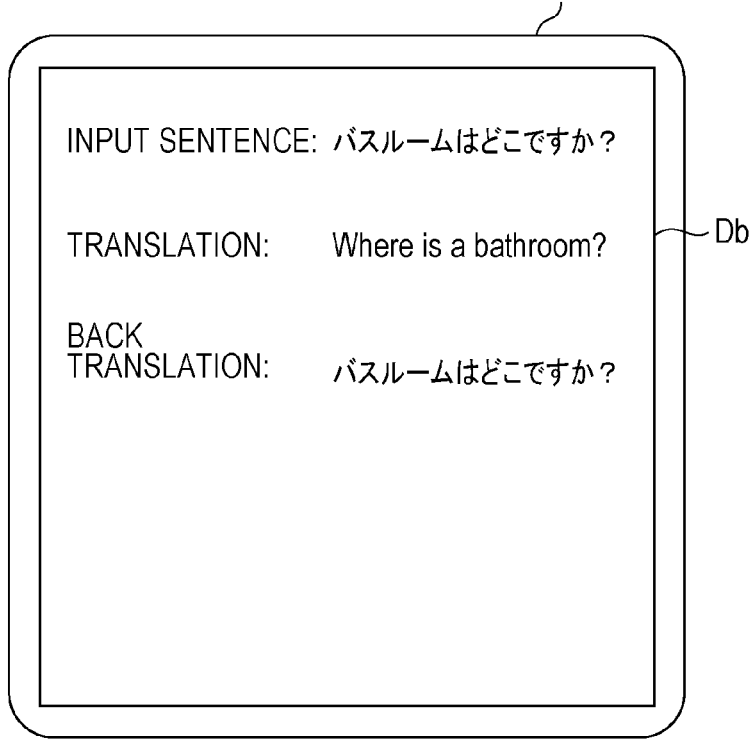
FIG. 5 is a diagram illustrating a second example of the translation information screen displayed on the display unit illustrated in FIG. 1.

FIG. 5 is a diagram illustrating a second example of the translation information screen displayed on the display unit 16 illustrated in FIG. 1. A translation information screen Db illustrated in FIG. 5 is a case in which an input sentence (a sentence in an original language) different from the input sentence on the translation information screen Da illustrated in FIG. 4 is input and then the same translation is generated but a different back translation is selected. That is, in the example illustrated in FIG. 5, "Where is a bathroom?" (Japanese) is input, "Where is a bathroom?" (English) is generated as a translation, and "Where is a bathroom?" (Japanese) is selected as a back translation that matches or is similar to the sentence in the original language. In this case, "Input sentence: Where is a bathroom?", "Translation: Where is a bathroom?", and "Back translation: Where is a bathroom?" are displayed on the translation information screen Db of the display unit 16.

As described above, the translation information screens Da and Db display the same translation while displaying different back translations according to different input sentences as a result of the process according to the present embodiment.

In the present embodiment, the translation on the translation information screen Da is generated by translating the input sentence on the translation information screen Da, the back translation on the translation information screen Da is generated by back-translating the translation on the translation information screen Da, and the input sentence on the translation information screen Da, the translation on the translation information screen Da, and the back translation on the translation information screen Da that semantically matches or is semantically similar to the input sentence on the translation information screen Da are output and displayed. In addition, the translation on the translation information screen Db is generated by translating the input sentence on the translation information screen Db, which is semantically different from the input sentence on the translation information screen Da, the back translation on the translation information screen Db is generated by back-translating the translation on the translation information screen Db, and, if the translation on the translation information screen Da and the translation on the translation information screen Db are the same, the input sentence on the translation information screen Db, the translation on the translation information screen Db, and the back translation on the translation information screen Db that is semantically different from the back translation on the translation information screen Da and semantically matches or is semantically similar to the input sentence on the translation information screen Db are output and displayed.

Figure 6:
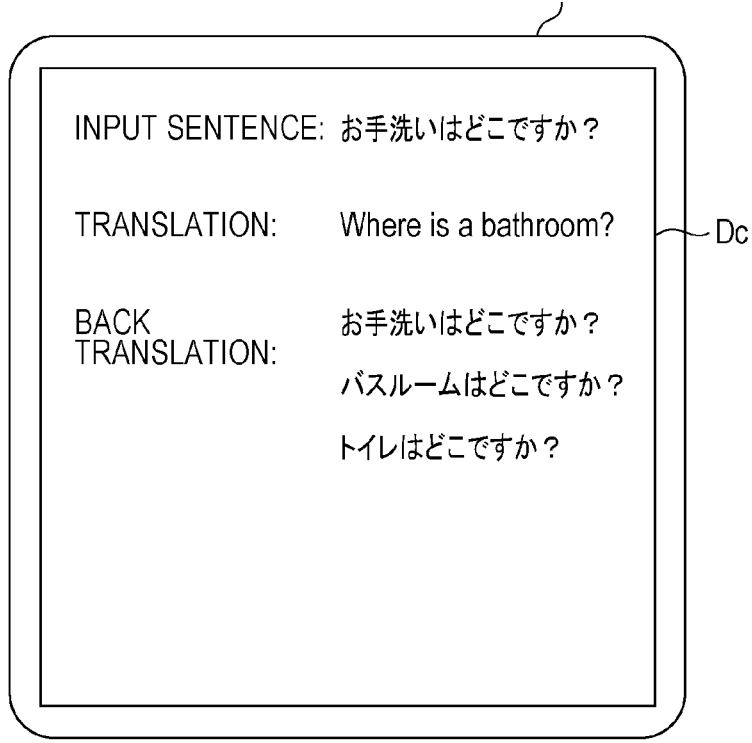
FIG. 6 is a diagram illustrating a third example of the translation information screen displayed on the display unit illustrated in FIG. 1.

FIG. 6 is a diagram illustrating a third example of the translation information screen displayed on the display unit 16 illustrated in FIG. 1. In the example illustrated in FIG. 6, "Where is a lavatory?" (Japanese) is input as an input sentence (a sentence in an original language), "Where is a bathroom?" (English) is generated as a translation, and a plurality of back translations, "Where is a lavatory?", "Where is a bathroom?", and "Where is a powder room?" (Japanese), are selected as back translations that match or are similar to the sentence in the original language. In this case, "Input sentence: Where is a lavatory?", "Translation: Where is a bathroom?", and "Back translation: Where is a lavatory? Where is a bathroom? Where is a powder room?" are displayed on a translation information screen Dc of the display unit 16.

A plurality of back translations may thus be displayed and arranged in descending or ascending order of the degree of similarity to an input sentence.

Figure 7:
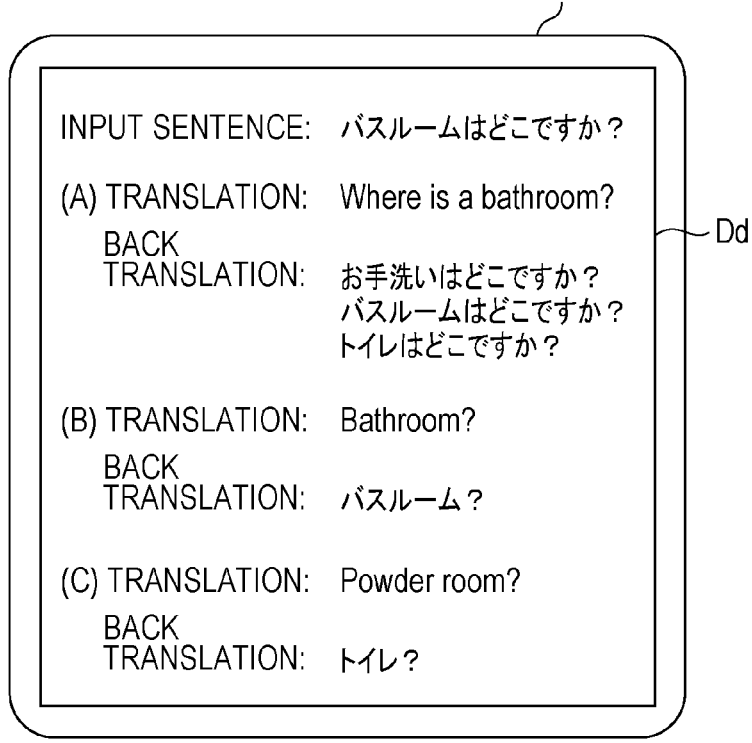
FIG. 7 is a diagram illustrating a fourth example of the translation information screen displayed on the display unit illustrated in FIG. 1.

FIG. 7 is a diagram illustrating a fourth example of the translation information screen displayed on the display unit 16 illustrated in FIG. 1. In the example illustrated in FIG. 7, "Where is a lavatory" (Japanese) is input as an input sentence (a sentence in an original language), a plurality of translations, "Where is a bathroom?", "Bathroom?", and "Powder room?" (English), are generated as translations, a plurality of back translations, "Where is a lavatory?", "Where is a bathroom?", and "Where is a powder room?" (Japanese), are selected for the translation "Where is a bathroom?" as back translations that match or is similar to the sentence in the original language, a back translation "Bathroom?" (Japanese) is selected for the translation "Bathroom?", and "Powder room?" (Japanese) is selected for the translation "Powder room?".

In this case, "Input sentence: Where is a lavatory?", "(A) Translation: Where is a bathroom? Back translation: Where is a lavatory? Where is a powder room? Where is a bathroom?", "(B) Translation: Bathroom? Back translation: Bathroom?", and "(C) Translation: Powder room? Back translation: Powder room?" are displayed on a translation information screen Dd of the display unit 16.

A plurality of translations may thus be displayed, or one or a plurality of back translations may be displayed for each translation. At this time, the translations may be arranged in descending or ascending order of the degree of similarity to an input sentence of a corresponding back translation.

Second Embodiment

Figure 8:
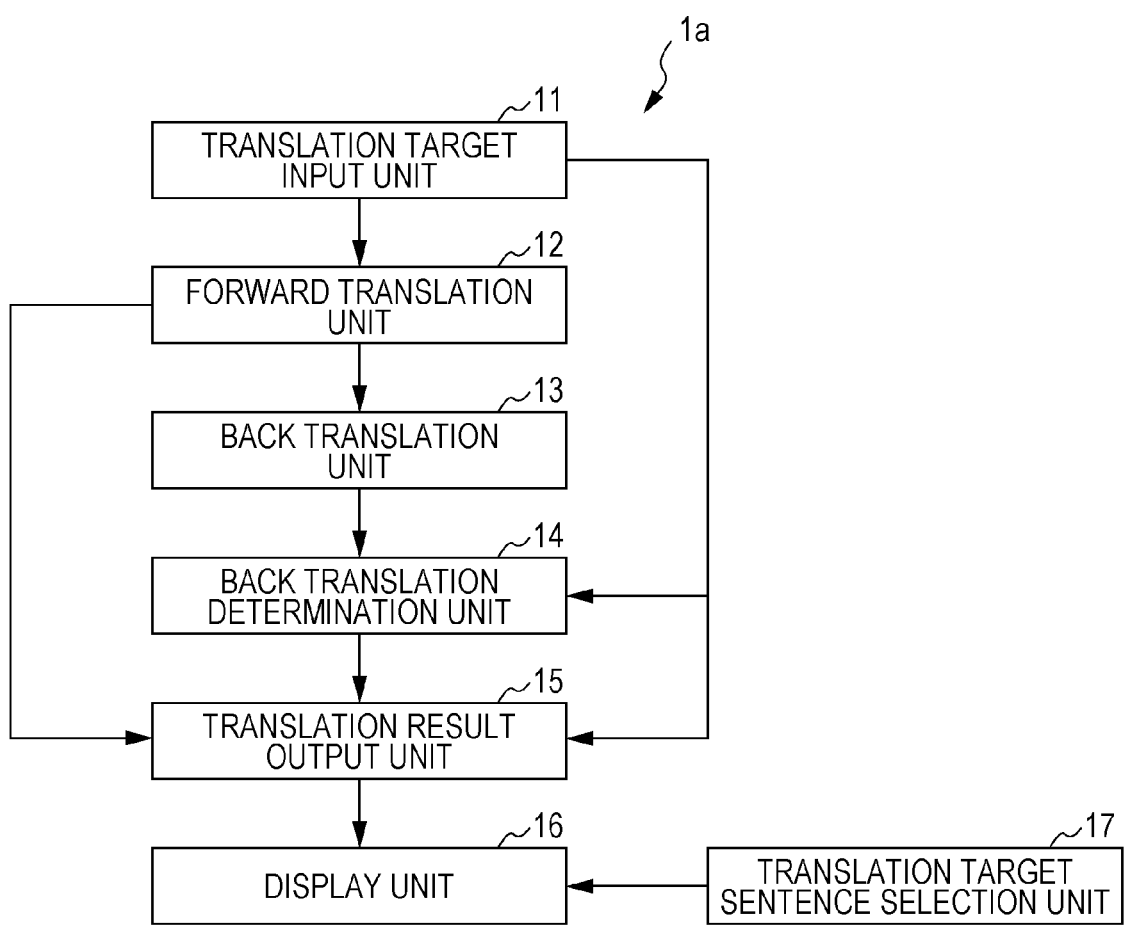
FIG. 8 is a block diagram illustrating an example of the configuration of a translation information providing apparatus according to a second embodiment of the present disclosure.

FIG. 8 is a block diagram illustrating an example of the configuration of a translation information providing apparatus 1a according to a second embodiment of the present disclosure. The translation information providing apparatus 1a illustrated in FIG. 8 includes the translation target input unit 11, the forward translation unit 12, the back translation unit 13, the back translation determination unit 14, the translation result output unit 15, the display unit 16, and a translation target sentence selection unit 17. The translation information providing apparatus 1a illustrated in FIG. 8 is different from the translation information providing apparatus 1 illustrated in FIG. 1 in that the translation target sentence selection unit 17 is added. Because the other components are the same, the same components are given the same reference numerals, and detailed description thereof is omitted.

The translation information providing apparatus 1a is a tablet, for example, and the display unit 16 and the translation target sentence selection unit 17 are touch panels or the like. The translation information providing apparatus 1a is used between a first user whose mother tongue is a first language, namely, for example, Japanese, and a second user whose mother tongue is a second language, namely, for example, English. The languages input, output, generated, and displayed by the translation information providing apparatus 1a are not particularly limited to Japanese and English, and may be other languages such as Chinese, Korean, French, German, Italian, Portuguese, Thai, Vietnamese, or Indonesian.

The translation target input unit 11 receives a Japanese translation target sentence input by the first user or an English translation target sentence input by the second user and outputs the Japanese or English translation target sentence to the forward translation unit 12, the back translation determination unit 14, and the translation result output unit 15. The forward translation unit 12 outputs, to the back translation unit 13 and the translation result output unit 15, a forward translation obtained by translating the translation target sentence input from the translation target input unit 11 from Japanese to English or from English to Japanese. The back translation unit 13 outputs a back translation obtained by back-translating the forward translation into Japanese or English to the back translation determination unit 14.

The back translation determination unit 14 determines whether there are a plurality of back translations. If there are a plurality of back translations, the back translation determination unit 14 compares the translation target sentence and each of the back translations in order to calculate a degree of similarity. The back translation determination unit 14 outputs a back translation whose degree of similarity to the translation target sentence is equal to or higher than a certain value to the translation result output unit 15 as a back translation result. If there is only one back translation, on the other hand, the back translation determination unit 14 outputs the back translation to the translation result output unit 15 as a back translation result. The translation result output unit 15 associates the translation target sentence, the back translation result determined by the back translation determination unit 14, and the forward translation corresponding to the back translation result with one another as an output sentence set and outputs the output sentence set to the display unit 16.

As described above, the translation information providing apparatus 1a performs the process for providing translation information illustrated in FIG. 2 or 3 on a Japanese sentence or an English sentence as with the translation information providing apparatus 1. Steps 17 and 17a, however, are replaced by the following step.

A display screen of the display unit 16 is divided into two display screens. A first display screen displays Japanese for the first user, and a second display screen displays English for the second user. The sentences displayed by the display unit 16 are selectively determined by the translation target sentence selection unit 17. The translation target sentence selection unit 17 may select any sentences chronologically included in the output sentence set in any order, or select the translation target sentence and the back translation result first, and then select the forward translation corresponding to the back translation result. Alternatively, the translation target sentence selection unit 17 may receive selection performed by a user and select the corresponding back translation result or the forward translation corresponding to the back translation result in accordance with the selection.

Next, a method for asking a user to make a determination will be specifically described. First, the display unit 16 displays a translation target sentence (first original sentence) and a back translation result (first back translation) of an output sentence set output from the translation result output unit 15. The first user determines whether to accept the back translation result. A translation information screen displayed on the display unit 16 includes an interface for enabling the user to make the determination.

Figure 9:
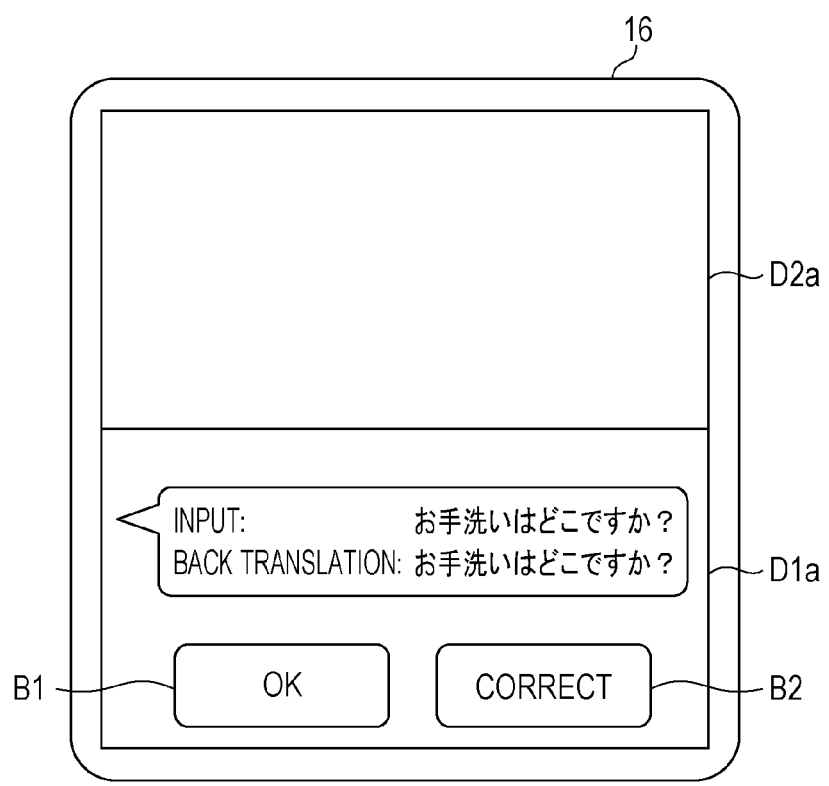
FIG. 9 is a diagram illustrating a first example of a translation information screen displayed on a display unit illustrated in FIG. 8.

FIG. 9 is a diagram illustrating a first example of the translation information screen displayed on the display unit 16 illustrated in FIG. 8. As illustrated in FIG. 9, the display unit 16 displays a first translation information screen D1a as the first display screen and a second translation information screen D2a as the second display screen. For example, the first translation information screen D1a displays "Input: Where is a lavatory?" (Japanese) as a translation target sentence and "Back translation: Where is a lavatory?" (Japanese) as a back translation result.

The first translation information screen D1a also displays an OK button B1 for enabling the first user who has read the translation target sentence and the back translation result to display a forward translation corresponding to the back translation result and a correct button B2 for enabling the first user to correct the back translation result and the forward translation when the back translation result does not match or is not similar to the translation target sentence.

Because the first user has not made a determination as to the translation target sentence and the back translation result, the second translation information screen D2a does not display anything. One of various processes may be performed after the correct button B2 is selected. For example, the display unit 16 may display a back translation result that is a next candidate in the output sentence set. If there is no other candidate, the display unit 16 may display an error message, such as "Translation failed".

The translation target sentence selection unit 17 receives an operation performed by the first user who has read the translation target sentence and the back translation result, the operation indicating that the first user desires to display a forward translation. The translation target sentence selection unit 17 then outputs a result of the operation to the display unit 16. Upon receiving the result of the operation performed by the first user, the display unit 16 displays the forward translation (first translation) in a direction different from a direction of the translation target sentence.

Figure 10:
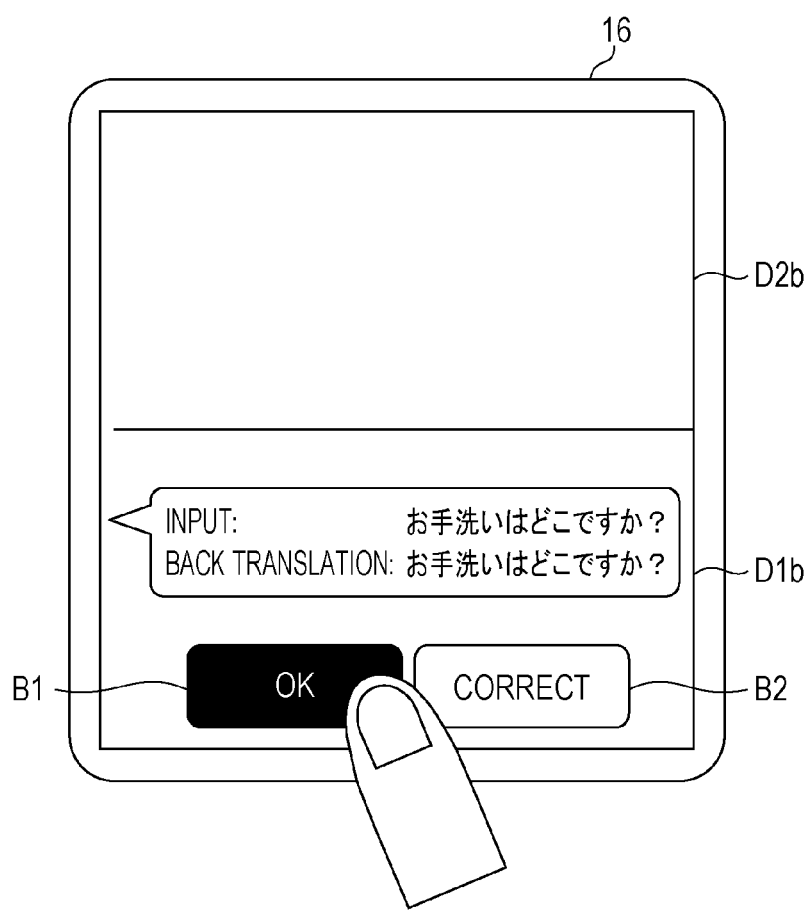
FIG. 10 is a diagram illustrating a second example of the translation information screen displayed on the display unit illustrated in FIG. 8.

FIG. 10 is a diagram illustrating a second example of the translation information screen displayed on the display unit 16 illustrated in FIG. 8. The first user reads and accepts the back translation result and touches the OK button B1 on a first translation information screen D1b illustrated in FIG. 10. The OK button B1 is highlighted, and the translation target sentence selection unit 17 receives the operation performed by the first user who has read the translation target sentence and the back translation result and outputs a result of the operation to the display unit 16.

Figure 11:
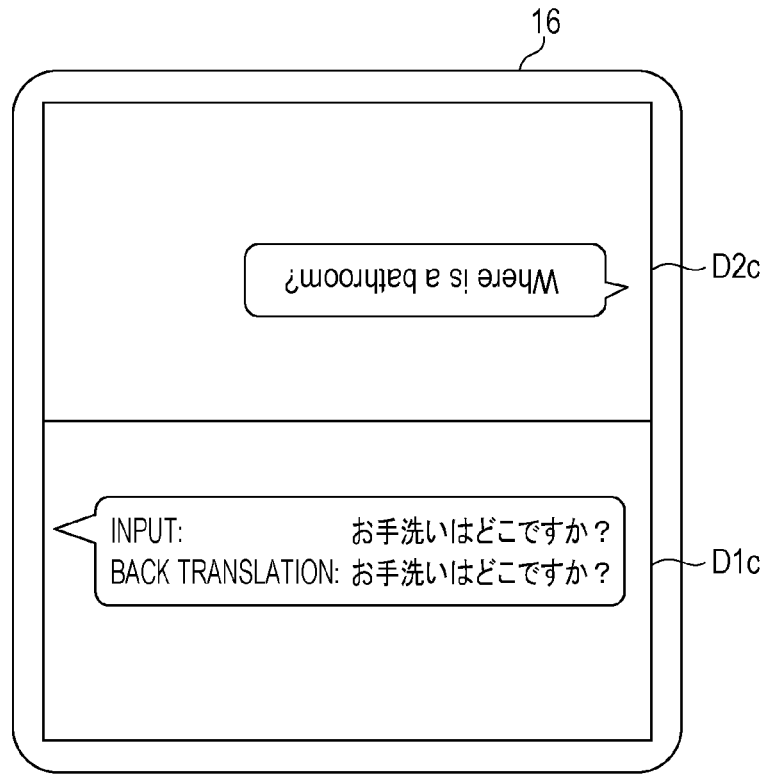
FIG. 11 is a diagram illustrating a third example of the translation information screen displayed on the display unit illustrated in FIG. 8.

FIG. 11 is a diagram illustrating a third example of the translation information screen displayed on the display unit 16 illustrated in FIG. 8. After the translation target sentence selection unit 17 outputs, to the display unit 16, a result of the operation performed by the first user who has read the translation target sentence and the back translation result, the display unit 16 displays a second translation information screen D2c as a second display screen as illustrated in FIG. 11. The display unit 16 displays, on the second translation information screen D2c, "Where is a bathroom?" (English), for example, as a forward translation in a direction different from a direction of the translation target sentence and the back translation result. The OK button B1 and the correct button B2 are not displayed on the first translation information screen D1c, and only the translation target sentence and the back translation are displayed.

The forward translation on the second translation information screen D2c is displayed such that the forward translation can be read from a top of FIG. 11, and the translation target sentence and the back translation result on the first translation information screen D1c are displayed such that the translation target sentence and the back translation result can be read from a bottom of FIG. 11. That is, the forward translation is displayed in a direction opposite to the direction of the translation target sentence. When the first and second users face each other and the translation information providing apparatus 1a is arranged between the first and second users, therefore, a Japanese translation target sentence and a Japanese back translation are displayed to the first user, and an English forward translation is displayed to the second user. A display direction of a translation target sentence and a display direction of a forward translation are not limited to the above example, and may be the same.

As described above, in the present embodiment, a forward translation in a target language corresponding to a back translation result is displayed only after the first user determines to accept the back translation result. With this configuration, it becomes possible to avoid displaying, to the second user, a translation that is not intended by the first user.

Next, another translation information screen displayed on the display unit 16 illustrated in FIG. 8 will be described. FIGS. 12 to 17 are diagrams illustrating first to sixth examples, respectively, of the other translation information screen displayed on the display unit 16 illustrated in FIG. 8. On the translation information screen illustrated in FIGS. 12 to 17, users (first and second users) whose mother tongues are different from each other talk to each other using their respective languages while reading back translations.

Figure 12:
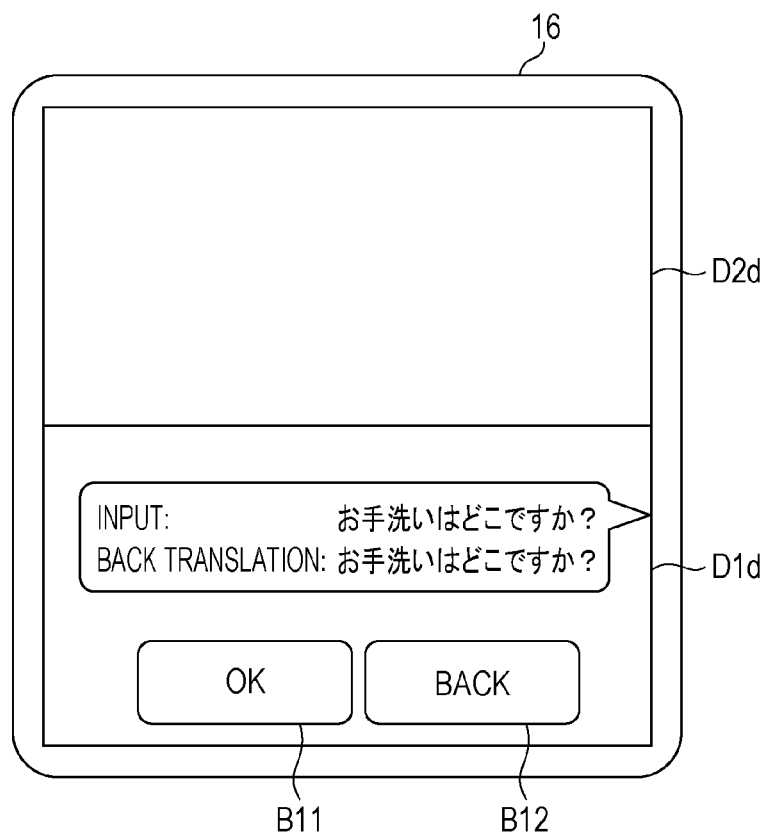
FIG. 12 is a diagram illustrating a first example of another translation information screen displayed on the display unit illustrated in FIG. 8.
Figure 13:
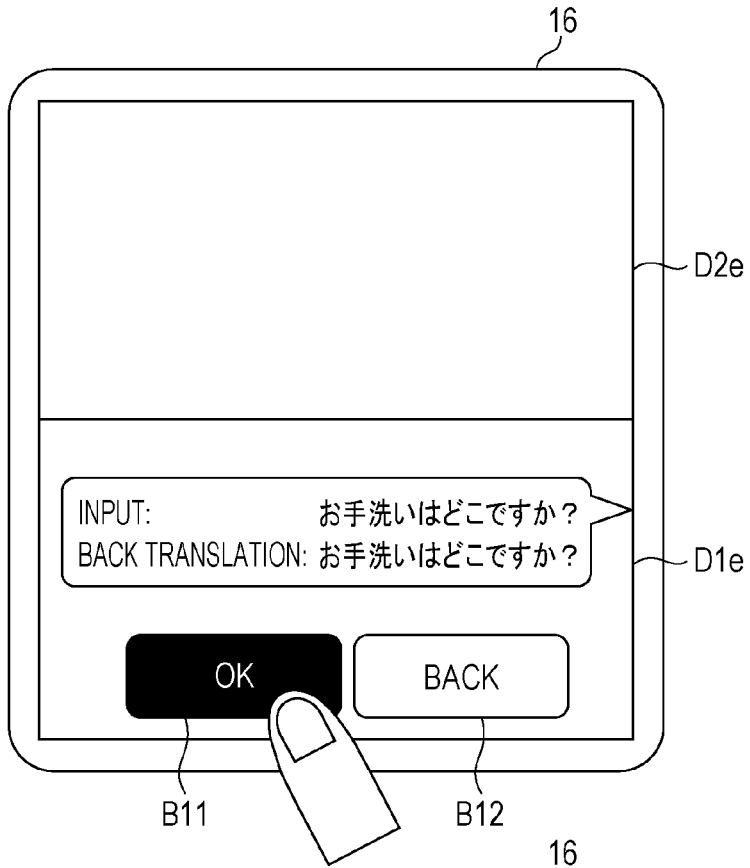
FIG. 13 is a diagram illustrating a second example of the other translation information screen displayed on the display unit illustrated in FIG. 8.

First, as illustrated in FIG. 12, the display unit 16 displays a first translation information screen D1d as a first display screen and a second translation information screen D2d as a second display screen. On the first translation information screen D1d, for example, "Input: Where is a lavatory?" (Japanese) is displayed as a translation target sentence and "Back translation: Where is a lavatory?" (Japanese) is displayed as a back translation result, that is, a translation target sentence and a back translation result are presented in Japanese.

The first translation information screen D1d also displays an OK button B11 for enabling the first user who has read the translation target sentence and the back translation result to display a forward translation corresponding to the back translation result and a back button B12 for enabling the first user to correct the back translation result and the forward translation when the back translation result does not match or is not similar to the translation target sentence.

Since the first user has not made a determination as to the translation target sentence and the back translation result, the second translation information screen D2d does not display anything. One of various processes may be performed after the back button B12 is selected. For example, the display unit 16 may display a back translation result that is a next candidate in the output sentence set. If there is no other candidate, the display unit 16 may display an error message, such as "Translation failed".

Next, the first user reads and accepts the back translation result. The first user touches the OK button B11 on a first translation information screen D1e illustrated in FIG. 13, and the OK button B11 is highlighted. The translation target sentence selection unit 17 receives the operation performed by the first user for the translation target sentence and the back translation result and outputs a result of the operation to the display unit 16.

Figure 14:
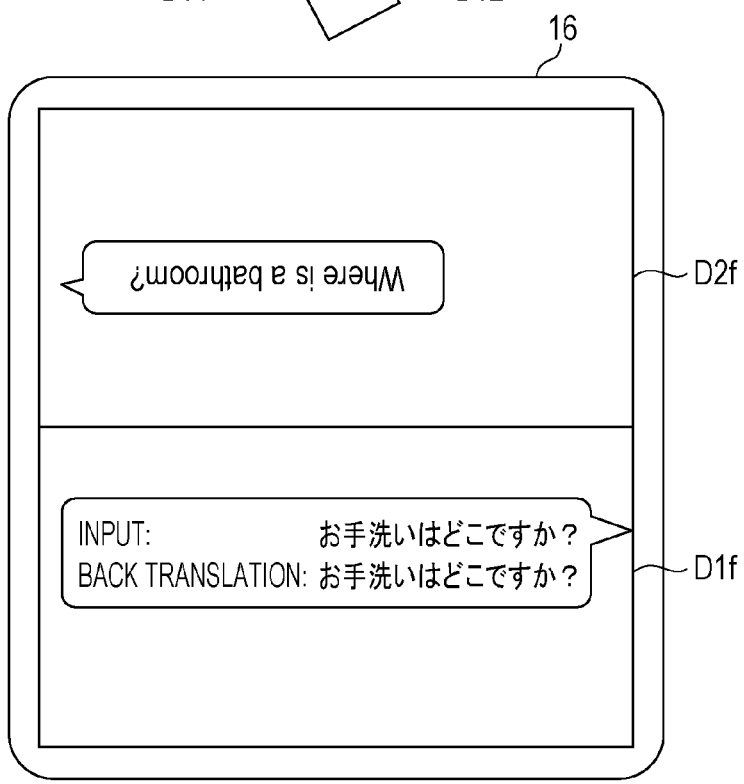
FIG. 14 is a diagram illustrating a third example of the other translation information screen displayed on the display unit illustrated in FIG. 8.

Next, as illustrated in FIG. 14, a second translation information screen D2f is displayed as a second display screen. "Where is a bathroom?", for example, is displayed on the second translation information screen D2f as an English forward translation in a direction different from a direction of the Japanese translation target sentence and back translation result. That is, a forward translation (e.g., English) corresponding to the back translation result read by the first user is displayed to the second user. The OK button B11 and the back button B12 are not displayed on the first translation information screen D1f, and only the Japanese translation target sentence and back translation result are displayed.

Figure 15:
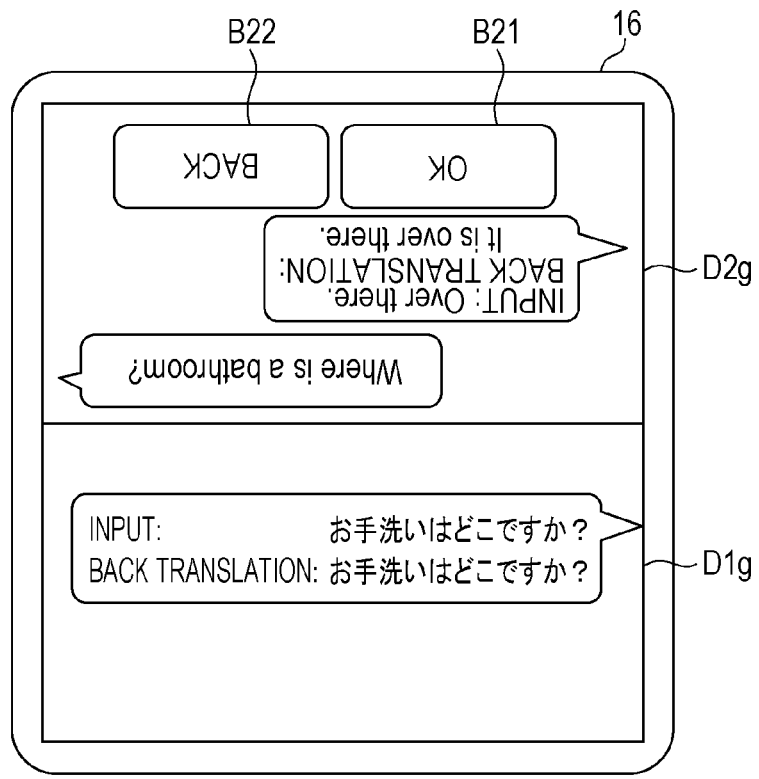
FIG. 15 is a diagram illustrating a fourth example of the other translation information screen displayed on the display unit illustrated in FIG. 8.
Figure 16:
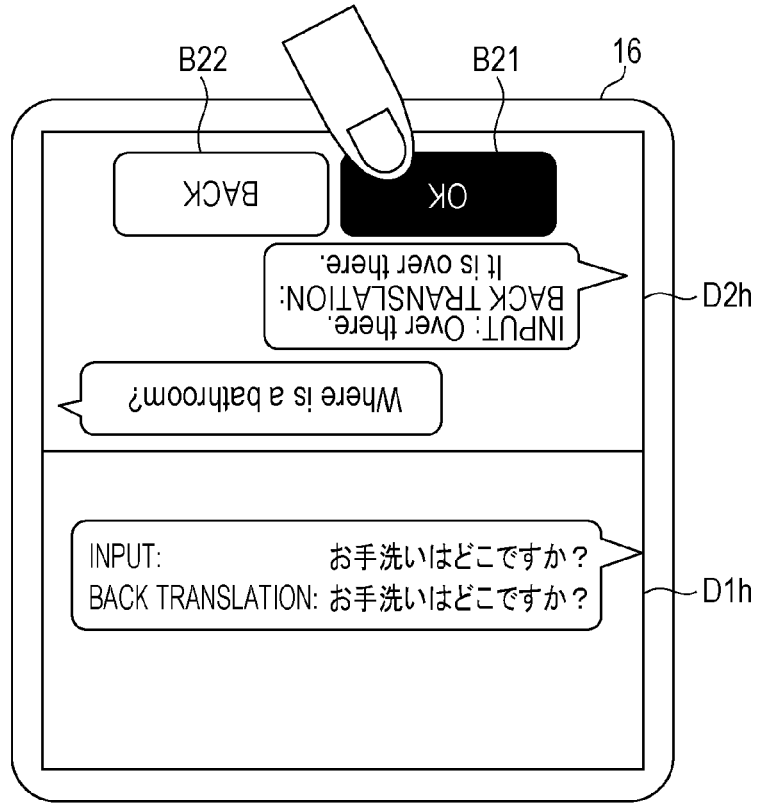
FIG. 16 is a diagram illustrating a fifth example of the other translation information screen displayed on the display unit illustrated in FIG. 8.

Next, the second user inputs an English translation target sentence, and, as illustrated in FIG. 15, the display unit 16 displays a second translation information screen D2g as a second display screen. "Input: Over there", for example, is displayed on the second translation information screen D2g as an English translation target sentence, and "Back translation: It is over there" is displayed as an English back translation result, that is, a translation target sentence and a back translation result are presented in English.

The second translation information screen D2g also displays an OK button B21 for enabling the second user who has read the translation target sentence and the back translation result to display a forward translation corresponding to the back translation result and a back button B22 for enabling the second user to correct the back translation result and the forward translation when the back translation result does not match or is not similar to the translation target sentence. One of various processes may be performed after the back button B22 is selected. For example, the display unit 16 may display a back translation result that is a next candidate in the output sentence set. If there is no other candidate, the display unit 16 may display an error message, such as "Translation failed".

Next, the second user reads and accepts the English back translation result. The second user touches the OK button B21 on a second translation information screen D2h illustrated in FIG. 16, and the OK button B21 is highlighted. The translation target sentence selection unit 17 receives the operation performed by the second user for the translation target sentence and the back translation result and outputs a result of the operation to the display unit 16.

Figure 17:
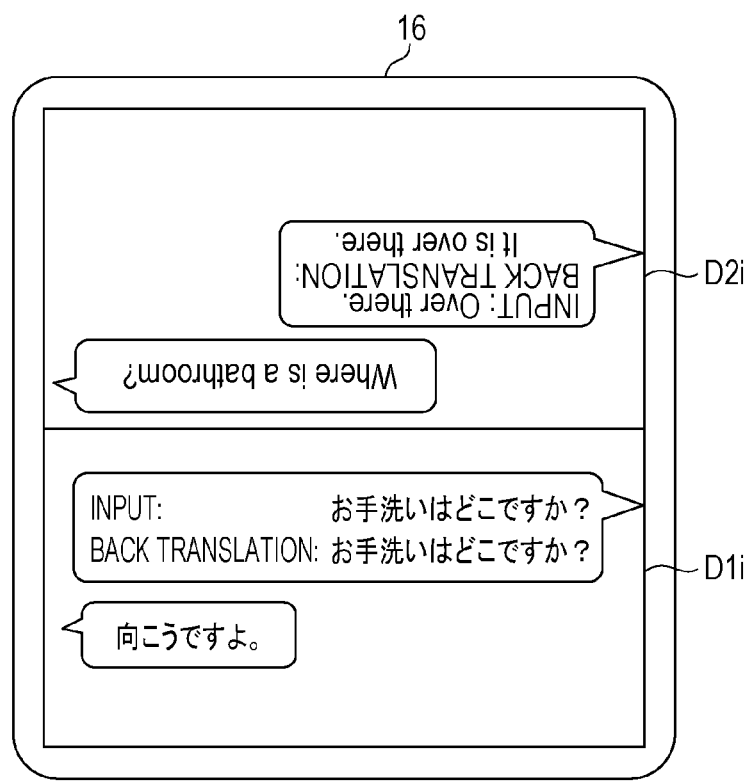
FIG. 17 is a diagram illustrating a sixth example of the other translation information screen displayed on the display unit illustrated in FIG. 8.

Next, as illustrated in FIG. 17, a first translation information screen D1i is displayed as a first display screen. "Over there", for example, is displayed on the first translation information screen D1i as a Japanese forward translation in a direction different from a direction of the English translation target sentence and back translation result. That is, a forward translation (e.g., Japanese) corresponding to the back translation result read by the second user is displayed to the first user. The OK button B21 and the back button B22 are not displayed on the second translation information screen D2i, and only the English translation target sentence and back translation result are displayed.

As described above, in the present embodiment, a forward translation in a target language corresponding to a back translation result is displayed only after the first user determines to accept the back translation result. In addition, a forward translation in a target language corresponding to a back translation result is displayed only after the second user determines to accept the back translation result. With this configuration, it becomes possible to avoid displaying, to each other, a translation that is not intended by the first and second users. It also becomes possible for the plurality of users to present translations in each other's language using their respective mother tongues or desired languages while reading back translations. As a result, the users can talk to each other in their respective mother tongues.

Although the back translation determination unit 14 is used in the present embodiment as in the first embodiment, the back translation determination unit 14 need not necessarily be used. For example, the back translation determination unit 14 may be omitted, and a user may display, using the translation target sentence selection unit 17 without selecting a back translation result on the basis of the degree of similarity, a forward translation corresponding to one of back translations generated by the back translation unit 13.

In the present disclosure, by performing translation twice, that is, (A) a sentence in an original language→(B) a translation in a target language→(C) a back translation in the original language, (A) the sentence in the original language and (C) the back translation in the original language tend to semantically match in estimation of the validity of the translation result in the target language, even when (B) the translation in the target language includes a word with multiple meanings. As a result, inconsistencies in the meaning of (C) the back translation in the original language, which is obtained by back-translating (B) the translation in the target language, can be suppressed. The present disclosure, therefore, is effective for a method for providing translation information, a translation information providing program, and a translation information providing apparatus that generate translations from original sentences.

What is claimed is:

1. A method for providing translation information performed by a translation information providing apparatus that translates a plurality of languages, the method comprising:
generating a first translation by translating a first original sentence in a first language into a second language;
generating a second translation by translating a second original sentence in the first language into the second language, the second original sentence being semantically different from the first original sentence;
generating a first back translation by back-translating the first translation into the first language;
generating a second back translation by back-translating the second translation into the first language;
determining whether the first back translation semantically matches or is semantically similar to the first original sentence;
displaying at least one of the first original sentence or the first translation, and the first back translation, in response to determining that the first back translation semantically matches or is semantically similar to the first original sentence;
determining whether the first translation generated from the first original sentence and the second translation generated from the second original sentence are the same;
in response to determining that the first translation and the second translation are the same,
  determining whether the second back translation is semantically different from the first back translation;
  determining whether the second back translation is semantically matches or is semantically similar to the second original sentence; and
  displaying at least one of the second original sentence or the second translation, and the second back translation, in response to determining that the second back translation is semantically different from the first back translation and that the second back translation semantically matches or is semantically similar to the second original sentence.

2. The method according to claim 1, further comprising:
generating a plurality of first back translations by back-translating the first translation into the first language;
generating a first back translation set including at least one back translation that semantically matches or is semantically similar to the first original sentence, the at least one back translation being one of the plurality of first back translations; and
displaying at least one of the first original sentence or the first translation and the first back translation set.

3. The method according to claim 1, further comprising:
generating a plurality of first translations by translating the first original sentence into the second language;
generating a plurality of first back translations by back-translating the plurality of first translations into the first language;
generating a first back translation set including at least one back translation that semantically matches or is semantically similar to the first original sentence, the at least one back translation is one of the plurality of first back translations; and
displaying at least one of the first original sentence or the first translation and the first back translation set.

4. The method according to claim 1, further comprising:
calculating a degree of similarity indicating whether the first back translation semantically matches the first original sentence or how much the first back translation is semantically similar to the first original sentence;
generating a first back translation set including at least one back translation whose degree of similarity is higher than a certain value; and
displaying at least one of the first original sentence or the first translation and the first back translation set.

5. The method according to claim 4, further comprising:
displaying the first original sentence and the first back translation set on a display; and
displaying, when a certain operation is performed for the first original sentence and the first back translation set, the first translation on the display.

6. The method according to claim 1, further comprising:
displaying the first original sentence and the first back translation on a display; and
displaying, when a certain operation is performed for the first original sentence and the first back translation, the first translation on the display.

7. The method according to claim 5, further comprising:
displaying, when the certain operation is input, the first translation on the display in an orientation different from an orientation of the first original sentence.

8. A non-transitory computer-readable recording medium storing a translation information providing program for causing a computer to function as a translation information providing apparatus that translates a plurality of languages, the computer performing operations comprising:
generating a first translation by translating a first original sentence in a first language into a second language;
generating a second translation by translating a second original sentence in the first language into the second language, the second original sentence being semantically different from the first original sentence;
generating a first back translation by back-translating the first translation into the first language;
generating a second back translation by back-translating the second translation into the first language;
determining whether the first back translation semantically matches or is semantically similar to the first original sentence;
displaying at least one of the first original sentence or the first translation, and the first back translation, in response to determining that the first back translation semantically matches or is semantically similar to the first original sentence;
determining whether the first translation generated from the first original sentence and the second translation generated from the second original sentence are the same;
in response to determining that the first translation and the second translation are the same,
  determining whether the second back translation is semantically different from the first back translation;
  determining whether the second back translation is semantically matches or is semantically similar to the second original sentence; and
  displaying at least one of the second original sentence or the second translation, and the second back translation, in response to determining that the second back translation is semantically different from the first back translation and that the second back translation semantically matches or is semantically similar to the second original sentence.

9. A translation information providing apparatus that translates a plurality of languages, the translation information providing apparatus comprising:
a processor; and
a recording medium storing a translation information providing program for causing the processor to perform operations including:
generating a first translation by translating a first original sentence in a first language into a second language;
generating a second translation by translating a second original sentence in the first language into the second language, the second original sentence being semantically different from the first original sentence;
generating a first back translation by back-translating the first translation into the first language;
generating a second back translation by back-translating the second translation into the first language;
determining whether the first back translation semantically matches or is semantically similar to the first original sentence;
displaying at least one of the first original sentence or the first translation, and the first back translation, in response to determining that the first back translation semantically matches or is semantically similar to the first original sentence;
determining whether the first translation generated from the first original sentence and the second translation generated from the second original sentence are the same;
in response to determining that the first translation and the second translation are the same,
  determining whether the second back translation is semantically different from the first back translation;
  determining whether the second back translation is semantically matches or is semantically similar to the second original sentence; and
  displaying at least one of the second original sentence or the second translation, and the second back translation, in response to determining that the second back translation is semantically different from the first back translation and that the second back translation semantically matches or is semantically similar to the second original sentence.

* * * * *